Aug. 5, 1969 F. ULRICH 3,460,133

ASYNCHRONOUS MAGNETIC CORE ANALOG-TO-DIGITAL CONVERTER

Filed Oct. 20, 1965 2 Sheets-Sheet 1

United States Patent Office 3,460,133

Patented Aug. 5, 1969

3,460,133

ASYNCHRONOUS MAGNETIC CORE ANALOG-TO-DIGITAL CONVERTER

Friedrich Ulrich, Stuttgart-Weilimdorf, Germany, assignor to International Standard Electric Corporation Filed Oct. 20, 1965, Ser. No. 498,397
Claims priority, application Germany, Nov. 16, 1964, St 22,946
Int. Cl. H03k *13/175;* H04l *3/00*
U.S. Cl. 340—347 5 Claims

ABSTRACT OF THE DISCLOSURE

An analog-digital converter is formed by a series of magnetic cores wired with an input lead which provides a number of turns over each core corresponding to the digit value of a digital output code. When the analogous value is reached the elements are shunted differentially, otherwise they are directly shunted by a short-circuit arrangement. The digital signal can be read from the position of the short-circuit arrangement after the conversion is completed.

The invention relates to an analog-digital converter for direct conversion of an input signal bearing analog information (in the form of the amplitude of a voltage) into a digital-coded output signal. Such facilities represent a special kind of code converter.

With known prior art facilities, in order to obtain from the input information (e.g. voltage amplitude) the desired coded output information, it is necessary to convert the analog input information into a 1-out-of-*n* code with the aid of a multistage comparing facility. This procedure is difficult to use because of problems involving tolerances and technique, and requires the aid of an additional coding circuit from which the digital-coded output information is then formed. The requirements of such an arrangement are high and rather costly.

At a regularly proceeding output code, e.g., the binary code, the translation also can be made sequential.

In facilities of this kind known to the art an extensive expenditure in control means is necessary and for some applications the time required is too long.

It is an object of the invention to reduce the material and time expenditures for an analog-digital converter.

The device, according to the invention, avoids the afore-described disadvantages in that the processing is quick and asynchronous. Magnetic elements are used as indicators and at the same time as coding elements. These magnetic elements enable, due to their freedom from precise potential requirements, an essentially simpler design and their storing capabilities simultaneously permit a sequential process. The synchronous processing is understood as a working sequence wherein each step depends on and is initiated by the previous result, thus avoiding a separate time control.

The analog-digital converter, according to the invention is characterized in this that it includes a number of magnetic elements which have a definite current threshold in their characteristic. These elements are threaded through by an electric input lead with a different number of windings per magnetic element. The number of windings corresponds in each element to a different digital value of the desired digital output code. Each of the magnetic elements has a first secondary winding with a uniform number of turns and a diode, biased in the blocking or nonconductive direction, which shunts the secondary winding when reaching a defined winding voltage differentially. The magnetic elements are each equipped with a second secondary winding, connected to a short-circuit arrangement which shunts said secondary winding, if a defined winding voltage falls short. After conversion, the digital-coded output signal can be read from the position of the short-circuit arrangements.

The aforementioned properties of the short-circuit arrangements can be achieved by circuit arrangements employing of flip-flops which, at a sufficiently high winding voltage, terminate the second secondary winding with a high resistance in one condition by blocking a triggering process. Blocking is initiated with a certain delay through a capacitor-resistor combination, due to pole inversion of the biased diode, and which, at a small winding voltage after the delayed triggering into the other condition short-circuits the second secondary winding via a diode.

If a voltage is applied to the input of converter the magnetic element is at first influenced at the code digit with the highest value, because the input lead here possesses the highest number of winding turns. When the winding voltage has reached a defined value the input voltage corresponds or even exceeds the voltage of the code digit with the highest value. The second secondary winding of said magnetic element is not shunted. When reaching the voltage corresponding to the code digit with the highest value the magnetic element is, however, shunted differentially via the first secondary winding. This causes a further increase of the current and the magnetic element is actuated at the next following code digit having less value.

If the winding voltage does not reach the defined voltage value in the just considered process at which the magnetic element is shunted differentially at the highest value code digit via the first secondary winding, the magnetic element is shunted via the second secondary winding through the associated short-circuit arrangement. Consequently, the voltage drop at this input winding becomes zero. By this process the current rises in the input lead and the magnetic element is actuated at the next following, lower-valued code digit. In this way all magnetic elements are actuated in the indirect sequence. A once actuated and thereby not short-circuited element remains up to the end of the translation (up to the restoring) in said condition automatically, if "time constants" of the magnetic elements are correspondingly dimensioned in a way known to the art. The magnetic elements thereby induce a voltage in the input loop which is oppositely directed to the measuring voltage. For the magnetic elements, successively actuated in the course of the translation, only the differential voltage between the input voltage and the induced voltage of previously served, but not shunted magnetic elements is available.

The values of the induced countervoyage correspond, due to the staggered winding turns, to the digit weight in the binary code. In the course of the translation process the residual input voltage is compared, always automatically, with the voltage associated to a digit of the output code. If the residual input voltage still has the value associated to the one of the code digit, or if said input value is higher, the respective code digit is marked. In a regularly advancing code all following code digits together do not reach the value of a higher valued code digit.

If the residual input voltage does not reach the value of the corresponding code digit, said digit is not marked. Caused by the occurring short-circuit the residual input voltage is advanced in its full magnitude to the inputs of the succeeding lower valued code digits.

The functioning of the short-circuit arrangement will be explained in connection with FIG. 2.

A current threshold corresponding to the current thresholds of rectangular cores can also be obtained with linear magnetic elements by means of an additional exterior circuit. FIG. 3 shows a corresponding arrangement which will be explained in connection with said figure.

Through these current thresholds one core after the other is actuated as known to the art.

Via a separate restoring line the short-circuit arrangements and the magnetic elements can be restored into the original condition, after the code conversion has been completed. The circuit indicated is not limited to the binary code. At a multivalue, but regularly advancing code the corresponding number of elements can be aligned to each code digit, whereby said elements are actuated exactly in the manner, indicated for the binary code.

Advancing the output information in series the same outputs of the shunting circuit can be differentiated and concentrated in an OR-circuit. A pulse sequence is obtained thus which corresponds to the respective output information.

The invention is now in detail explained with the aid of the accompanying drawings, wherein.

Figure 1:
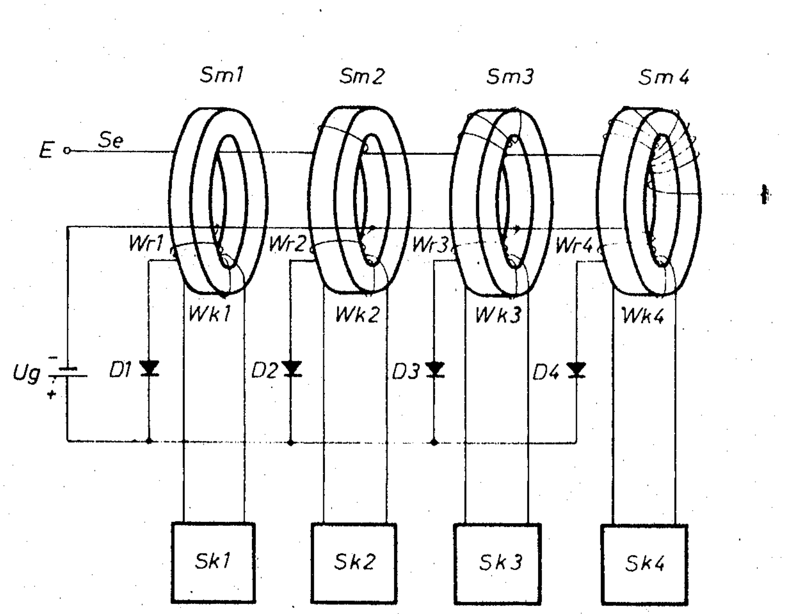
FIG. 1 shows the entire design of the analog-digital converter.

The analog-digital converter according to FIG. 1 is equipped with four magnetic elements S*m*1 to S*m*4, in compliance with a four-digit binary output code. Corresponding to the digital values in the binary code the input lead S*e* bears on the magnetic element windings with a winding turn ratio of 1:2:4:8.

The example shows only the magnetic elements with the winding turns 1, 2, 4, and 8, but the turns could also be an integral multiple of them. The magnetic elements are each equipped with a first secondary winding W*r*1 to W*r*4 and a second secondary winding W*k*1 to W*k*4. The two windings of the first secondary winding are connected to a voltage source U*g* via a diode D1 to D4, biased in the blocking direction. These diodes limit the winding voltage always to the value ½ U*g* since, at a higher winding voltage, the diode is poled in the conductive direction. The magnetic element is shunted differentially in the secondary winding. The second secondary winding is connected with one of the short-circuit arrangements S*k*1 to S*k*4. The magnetic elements may also be equipped with further auxiliary windings, shown in FIG. 2, but not indicated in FIG. 1.

Figure 2:
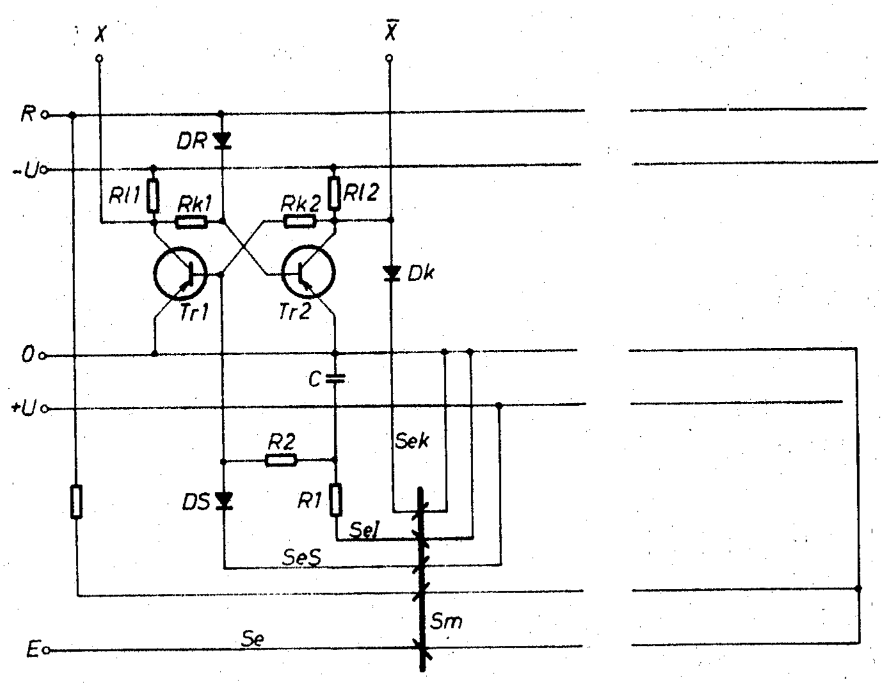
FIG. 2 shows an example of the shunting circuit.

FIG. 2 shows a possible design of the short-circuit arrangements. The basic unit consists of a flip-flop with the transistors T*r*1 and T*r*2, the load resistors R*l*1 and R*l*2, and the coupling resistors R*k*1 and R*k*2.

The outputs X and $\overline{X}$ serve to render the binary-coded information after the analog-digital conversion has been completed. In the original condition the transistor T*r*2 is blocked, the diode D*k* is poled in the nonconductive direction. Thus the magnetic element is not shunted via the loop S*ek*. If the current, generated by the measuring voltage, changes the condition of the magnetic element S*m* in the loop S*e* a voltage is induced in the indicating loop S*e*I which positively operates the base of transistor T*r*1 via the resistors R1 and R2, and somewhat delayed by the capacitor C. As long as the amplitude of the voltage, induced in the blocking loop S*e*S in reverse direction, does not exceed the value +U the diode DS, biased with +U, remains poled in the blocking direction.

The positive voltage appearing somewhat delayed at the base of transistor T*r*1 becomes effective and triggers the flip-flop circuit so that transistor T*r*2 becomes conductive. The magnetic element S*m* is shunted on its secondary side via the diode D*k*.

If the voltage induced in the loop S*e*S tries to exceed the value +U in the reversed direction to the bias, the diode DS and the emitter-base path of the transistor T*r*1 becomes conductive, the winding voltage is limited to a fixed value. The flip-flop, triggered by the inducting voltage at the loop S*e*I, appearing somewhat delayed and having a higher internal resistance, is thus prevented.

Through positive actuation of the restoring lead R the short-circuit arrangements *S*k1 to S*k*4 and the magnetic elements S*m*1 to S*m*4 can be restored after the translation has been completed.

Figure 3:
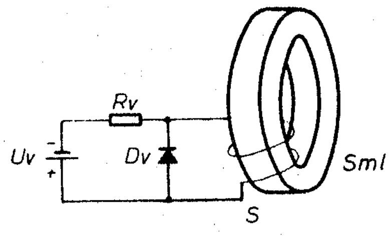
FIG. 3 represents a circuit to produce a current threshold with a linear magnetic element, corresponding to a rectangular hysteresis loop.

With the arrangement shown in FIG. 3 a current threshold can be obtained for linear magnetic elements S*m*1, similar to the current threshold for the rectangular hysteresis loop of nonlinear magnetic elements. This current threshold effects, as it is known, the successive actuation of the individual elements.

Through a voltage source, having the voltage U*v*, the diode D*v* is made conductive via a resistor R*v*. If a current I is induced in the loop S, with a magnitude greater than the corresponding current produced by the ratio U*v*:R*v*, the voltage in the loop changes if the induced current flows in a direction opposite to the current direction, determined by the voltage U*v*. Selecting a high voltage U*v* and a high resistance R*v* a current can be generated which provides a suitable threshold level.

What is claimed is:

1. An analog-digital converter comprising a plurality of magnetic elements having a current threshold in their characteristic, an input lead looping successively through each of the magnetic elements, the input lead including a different number of winding turns for each magnetic element proportioned according to the number of digits of the desired digital output code, first secondary windings wound on each magnetic element with a uniform number of turns, a diode connected in series with each first secondary winding, means reverse biasing each diode to enable the diode to differentially shunt the first secondary winding when a defined winding voltage is reached, and a second secondary winding wound on each magnetic element with a uniform number of turns and coupled to a short-circuit arrangement to shunt the second secondary winding when a defined winding voltage falls short of a given level, whereby the digital-coded output signal can be determined from the collective condition of the short-circuit arrangement associated with each winding after conversion is completed.

2. An analog-digital converter according to claim 1, in which the short-circuit arrangements employ flip-flop circuits which, at a sufficiently high winding voltage, through blocking of a trigger process, initiated with a delay via a capacitor-resistor combination (C, R1, R2) by means of pole inversion of a biased diode (D*s*), terminate in one switching condition (T*r*1) the second secondary winding (W*k*1, S*ek*) with a high resistance, and which at the low winding voltage, after the delayed triggering, in the other switching condition (T*r*2) shunt the second secondary winding via a diode (D*k*).

3. An analog-digital converter according to claim 1, in which the limit between high and low winding voltage coincides with the bias of the first secondary winding.

4. An analog-digital converter according to claim 1, in which the current threshold in the characteristic of the magnetic elements is formed by the rectangular hysteresis loop of the magnetic material.

5. An analog-digital converter according to claim 1, in which the current threshold of the magnetic elements is determined by an additional circuit, consisting of a voltage source ($U_v$), a resistor ($R_v$), and a diode ($D_v$) connected together in series with the winding of a magnetic element connected to the additional circuit across the terminals of the diode.

References Cited

UNITED STATES PATENTS

| | | | |
|---|---|---|---|
| 2,962,704 | 11/1960 | Buser | 340—347 |
| 2,967,949 | 1/1961 | Loewe. | |
| 3,079,598 | 2/1963 | Wald | 340—347 |
| 3,127,600 | 3/1964 | Kaenel | 340—347 |

MAYNARD R. WILBUR, Primary Examiner

MICHAEL K. WOLENSKY, Assistant Examiner

U.S. Cl. X.R.

340—174